US008438338B2

(12) United States Patent
Flemming et al.

(10) Patent No.: US 8,438,338 B2
(45) Date of Patent: May 7, 2013

(54) FLEXIBLE USE OF EXTENDED CACHE USING A PARTITION CACHE FOOTPRINT

(75) Inventors: Diane Garza Flemming, Pflugerville, TX (US); William A. Maron, Austin, TX (US); Ram Raghavan, Old Round Rock, TX (US); Mysore Sathyanarayana Srinivas, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/856,682

(22) Filed: Aug. 15, 2010

(65) Prior Publication Data

US 2012/0042131 A1    Feb. 16, 2012

(51) Int. Cl.
*G06F 12/02* (2006.01)
(52) U.S. Cl.
USPC ............ 711/129; 711/2; 711/118; 711/170; 711/173
(58) Field of Classification Search .................. 711/129, 711/2, 118, 170, 173
See application file for complete search history.

(56) References Cited

U.S. PATENT DOCUMENTS

| | | | | |
|---|---|---|---|---|
| 6,148,367 | A * | 11/2000 | Tsuboi et al. ................. | 711/113 |
| 6,604,174 | B1 * | 8/2003 | Dean et al. .................... | 711/131 |
| 6,973,538 | B2 * | 12/2005 | Khawand et al. ............. | 711/130 |
| 2001/0034809 | A1 * | 10/2001 | Ogawa ........................ | 711/103 |
| 2003/0065886 | A1 * | 4/2003 | Olarig et al. .................. | 711/129 |
| 2004/0059877 | A1 * | 3/2004 | Brown et al. ................. | 711/144 |

OTHER PUBLICATIONS

U.S. Appl. No. 12/508,621, filed Jul. 23, 2009, Flemming et al.

Dybdahl, "Architectural Techniques to Improve Cache Utilization," Dept. of Comp. Sci., Norwegian University of Sci. & Tech., 2007.
Douglis et al., "Flash Memory File Caching for Mobile Computers," Matsushita Info. Tech. Lab., IEEE, 1993.
"Large Memory Support for 32-Bit Linux," *New Functionality in Adaptive Server 12.5.2*, Chapter 11, printed Nov. 2008.
Leventhal, "Flash Storage Today," *ACM Queue*, p. 24-30, Jul./Aug. 2008.
Lorch, "Operating Systems Techniques for Reducing Processor Energy Consumption," PhD Dissertation, U. of Calif. Berkeley, 2001.
Russinovich, "Windows Administration: Inside the Windows Vista Kernel: Part 2," TechNet, 2008.
Tam et al., "Managing Shared L2 Caches on Multicore Systems in Software," Workshop on the Interaction between Operating Systems and Computer Architecture (WIOSCA 2007), San Diego, CA, Jun. 2007, 8 pages.

* cited by examiner

*Primary Examiner* — Jae Yu
(74) *Attorney, Agent, or Firm* — Van Leeuwen & Van Leeuwen; Libby L. Toub

(57) ABSTRACT

An approach is provided to identifying cache extension sizes that correspond to different partitions that are running on a computer system. The approach extends a first hardware cache associated with a first processing core that is included in the processor's silicon substrate with a first memory allocation from a system memory area, with the system memory area being external to the silicon substrate and the first memory allocation corresponding to one of the plurality of cache extension sizes that corresponds to one of the partitions that is running on the computer system. The approach further extends a second hardware cache associated with a second processing core also included in the processor's silicon substrate with a second memory allocation from the system memory area with the second memory allocation corresponding to another of the cache extension sizes that corresponds to a different partitions that is being executed by the second processing core.

14 Claims, 7 Drawing Sheets

FLEXIBLE USE OF EXTENDED CACHE USING A PARTITION CACHE FOOTPRINT

TECHNICAL FIELD

The present invention relates to flexibly using memory-based extended caches in a multi-partitioned system by calculating partition cache footprints associated with the partitions.

BACKGROUND OF THE INVENTION

A CPU cache is a cache used by the central processing unit of a computer to reduce the average time to access memory. The cache is a smaller, faster memory which stores copies of the data from the most frequently used main memory locations. As long as most memory accesses are cached memory locations, the average latency of memory accesses will be closer to the cache latency than to the latency of main memory.

A cache memory is a cache used by a processing unit, or core, of a computer to reduce the average time to access memory. It is generally faster to store and retrieve memory from the cache than from main memory. When a processor core needs to read from or write to a location in main memory, it first checks whether a copy of that data is in the cache. If so, the processor immediately reads from or writes to the cache, which is faster than reading from or writing to main memory. A multi-core node is composed of two or more independent processing cores. The cores are typically integrated onto a single integrated circuit die, or they may be integrated onto multiple dies in a single chip package, or substrate. An extended memory cache extends the hardware-based cache located on the node substrate to system memory to extend the amount of memory available in the cache.

SUMMARY

An approach is provided to identifying cache extension sizes that correspond to different partitions that are running on a computer system. The approach extends a first hardware cache associated with a first processing core that is included in the processor's silicon substrate with a first memory allocation from a system memory area, with the system memory area being external to the silicon substrate and the first memory allocation corresponding to one of the plurality of cache extension sizes that corresponds to one of the partitions that is running on the computer system. The approach further extends a second hardware cache associated with a second processing core also included in the processor's silicon substrate with a second memory allocation from the system memory area with the second memory allocation corresponding to another of the cache extension sizes that corresponds to a different partitions that is being executed by the second processing core.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
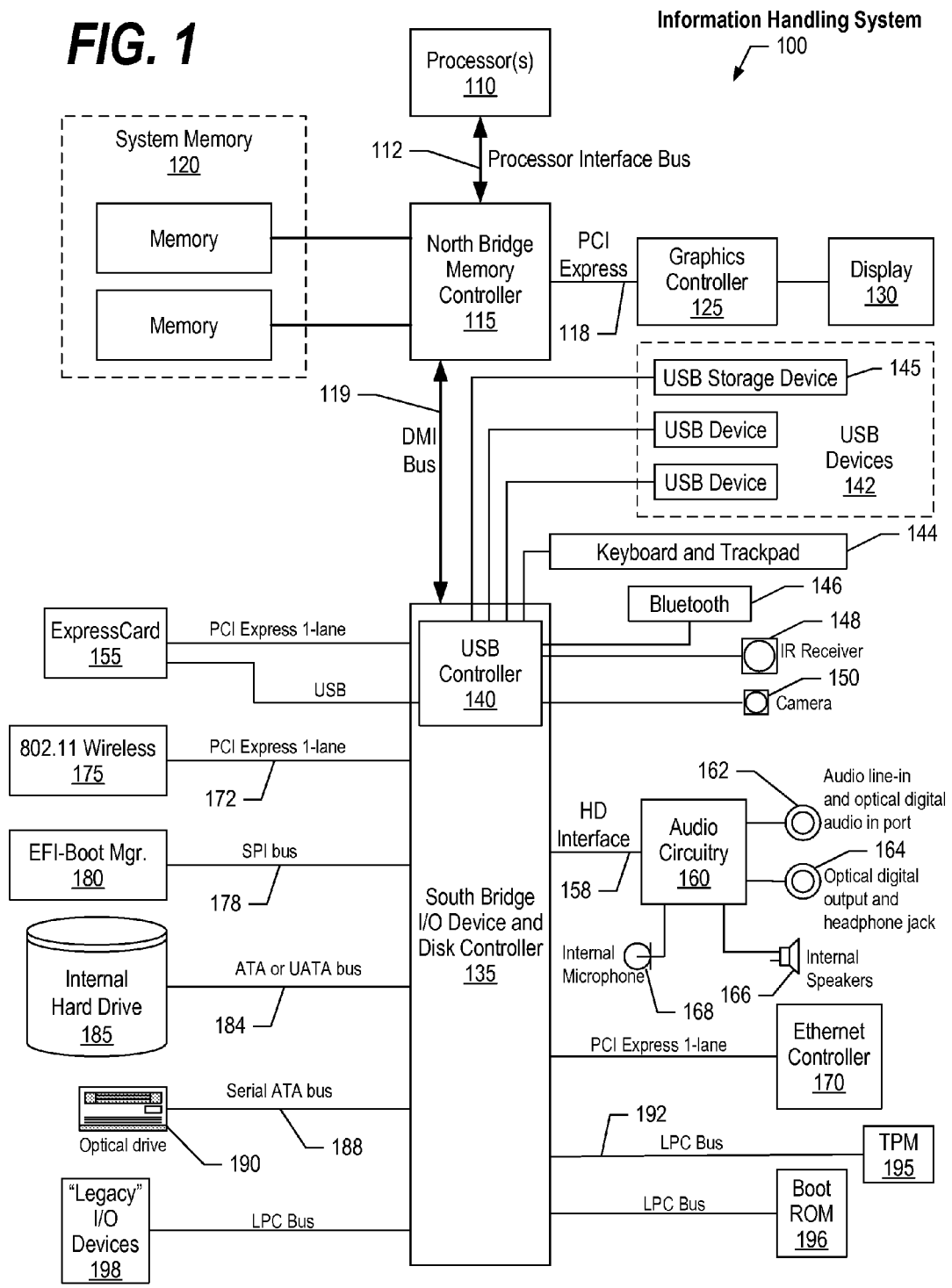
FIG. 1 is a block diagram of a data processing system in which the methods described herein can be implemented.
Figure 2:
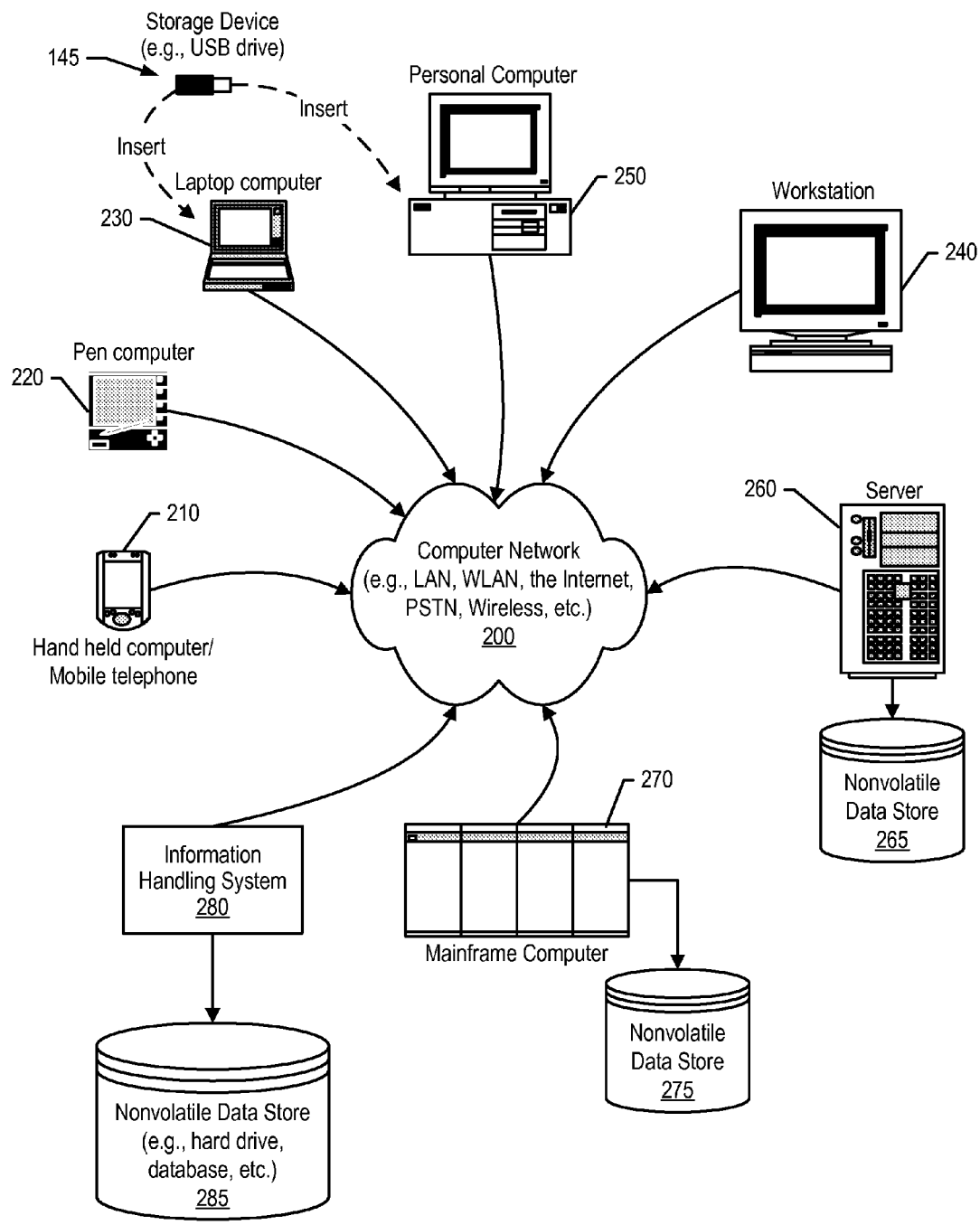
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
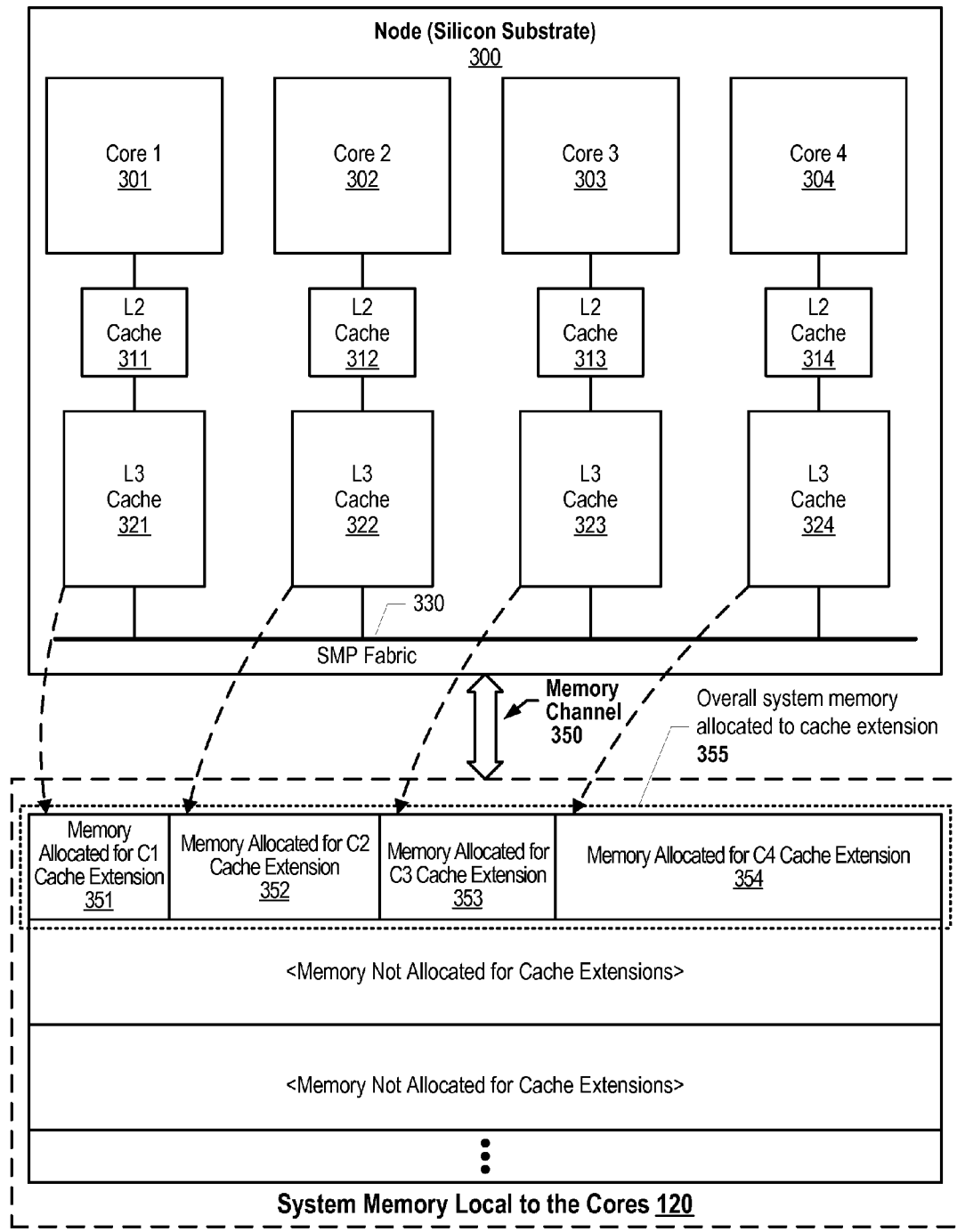
FIG. 3 is a an diagram showing a processing node with multiple processing cores and an extended cache located in system memory that is divided up between the various partitions running in the system.

FIG. 3 is an diagram showing a processing node with multiple processing cores, both disabled and active, where the inactive core's cache memory is utilized by one of the active cores. Node 300 includes components that are integrated onto a common substrate, such as a single integrated circuit (IC) die, or multiple dies in a single chip package. While node 300 is shown with four total processing cores, those skilled in the art will appreciate that a different number of processing cores can be included in a node to utilize the present invention as set forth in the claims.

Each of the processing cores includes one or more cache memories. In the diagram shown in FIG. 3, each of the processing cores has an L2 cache memory associated with it (L2 Caches 311, 312, 313, and 314 associated with processing cores 301, 302, 303, and 304, respectively). In addition, each of the processing cores includes an L3 cache memory (L3 Caches 321, 322, 323, and 324 associated with processing cores 301, 302, 303, and 304, respectively). A common bus (such as SMP fabric 330) is included in node 300 and is used to connect the various node components to one another.

A high speed interface, such as Memory Channel 350, connects common bus 330 to system memory 120 which is local to the respective processing cores. A portion of system memory 120 is allocated as a cache extension (cache extension 355) which extends the caches associated with one or more processing cores. Cache extension area 350 can be divided amongst two or more processing cores evenly (with each extension receiving an equal amount of the cache extension area) or unevenly (with some processing cores receiving more or less amount of the cache extension area).

Figure 4:
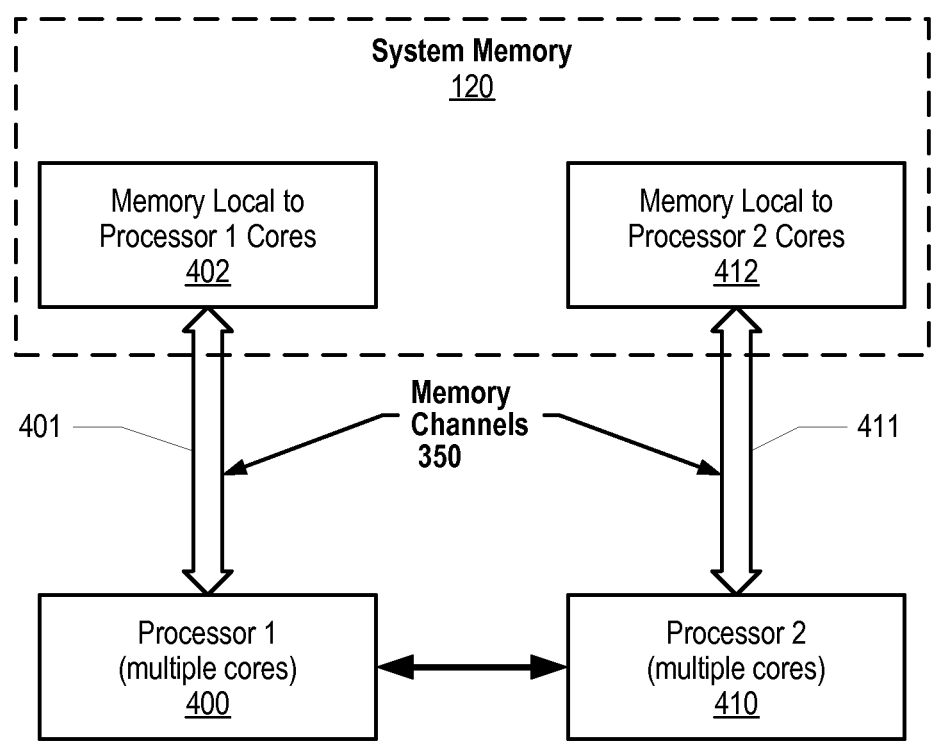
FIG. 4 is a diagram showing system memory, where the cache extension memory resides. As shown, the system memory is local to one or more processing cores. In one embodiment, a processing core can access both memory that is local and not local to that processing core, however the processing core (which is a core included in one of the processors) can access memory that is local to the processing core considerably faster due to the direct connection provided by its memory channel.

FIG. 4 is a diagram showing system memory, where the cache extension memory resides. As shown, the system memory is local to one or more processing cores. In one embodiment, a processing core can access both memory that is local and not local to that processing core, however the processing core (which is a core included in one of the processors) can access memory that is local to the processing core considerably faster due to the direct connection provided by its memory channel. In the example shown, memory 402 is local to processing cores included in processor 1 (400) via memory channel 401. Likewise, memory 412 is local to processing cores included in processor 2 (410) via memory channel 411.

Figure 5:
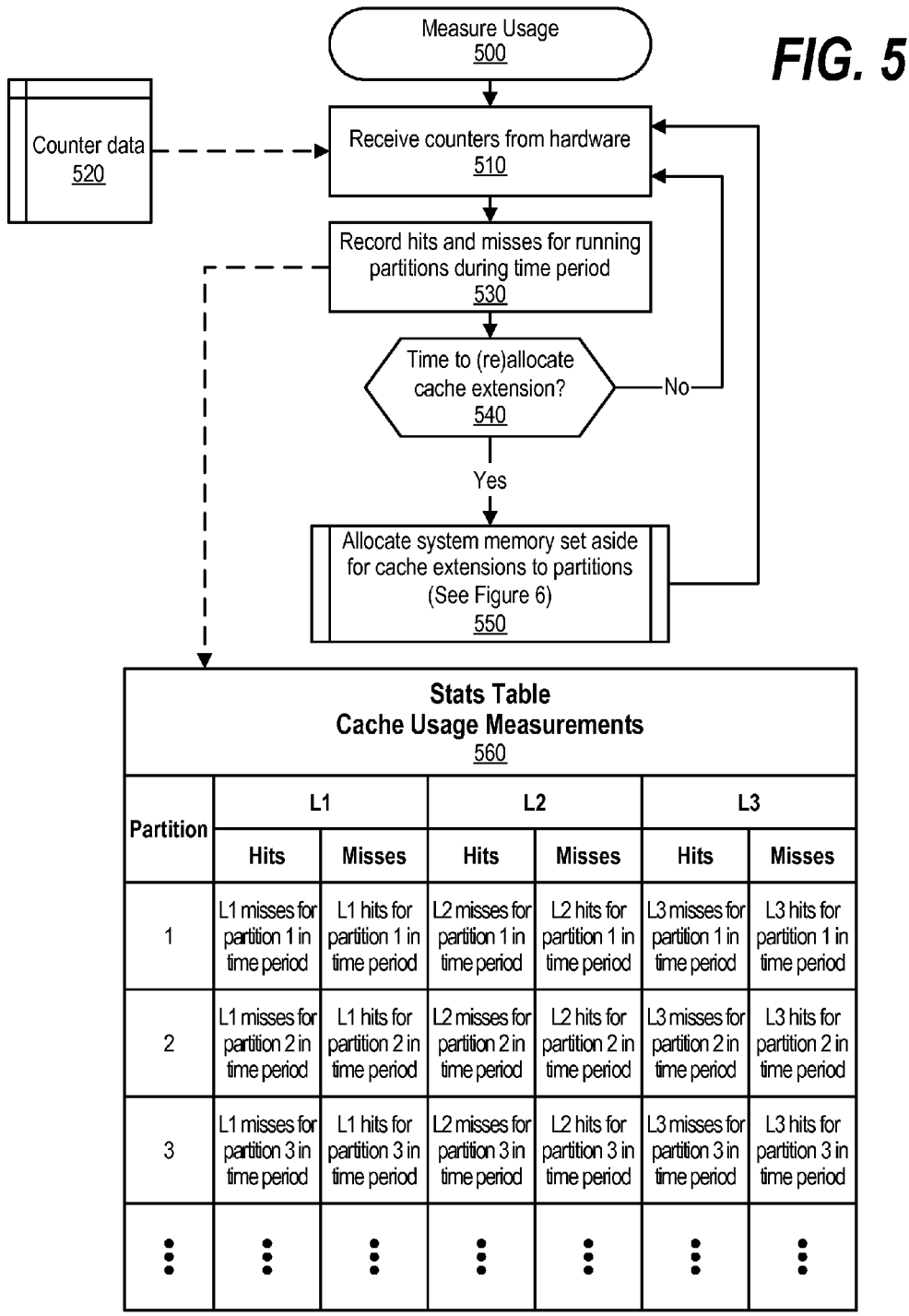
FIG. 5 is a flowchart showing steps used to measure cache usage by the various partitions running in the system.

FIG. 5 is a flowchart showing steps used to measure cache usage by the various partitions running in the system. Processing commences at 500 whereupon, at step 510, counters are received from hardware (memory 520). At step 530, cache hits and misses are recorded while one of the partitions is running during a time interval. The data is recorded in statistics table 560 that is used to store cache usage measurements. In the embodiment shown, hits and misses are recorded while different partitions are running. In addition, hits and misses are recorded for different types of caches (e.g., L1 cache, L2 cache, L3 cache, etc.). In other embodiments, statistics may be maintained for different caches (e.g., only maintaining cache statistics for L3 cache usage, etc.).

A determination is made as to whether it is time to reallocate the cache extensions provided to the various partitions (decision 540). Various triggers can be used to determine whether it is time to reallocate. For example, a timer can be used so that reallocation occurs on a time interval (e.g., every second, etc.). In addition, one or more thresholds can be used to determine if it is time to reallocate, such as when one of the partition's miss to hit ratio reaches a particular level. If it is time to reallocate the cache extension, decision 540 branches to the "yes" branch whereupon, at predefined process 550, the system memory that is set aside for cache extensions to the various partitions is reallocated (see FIG. 6 and corresponding text for details). After reallocation, processing uses the newly reallocated system memory and continues to measure cache usage as described above. Returning to decision 540, if it is not yet time to reallocate the system memory to the various partitions, then decision 540 branches to the "no" branch bypassing predefined process 550 and processing continues to measure cache usage as described above.

Figure 6:
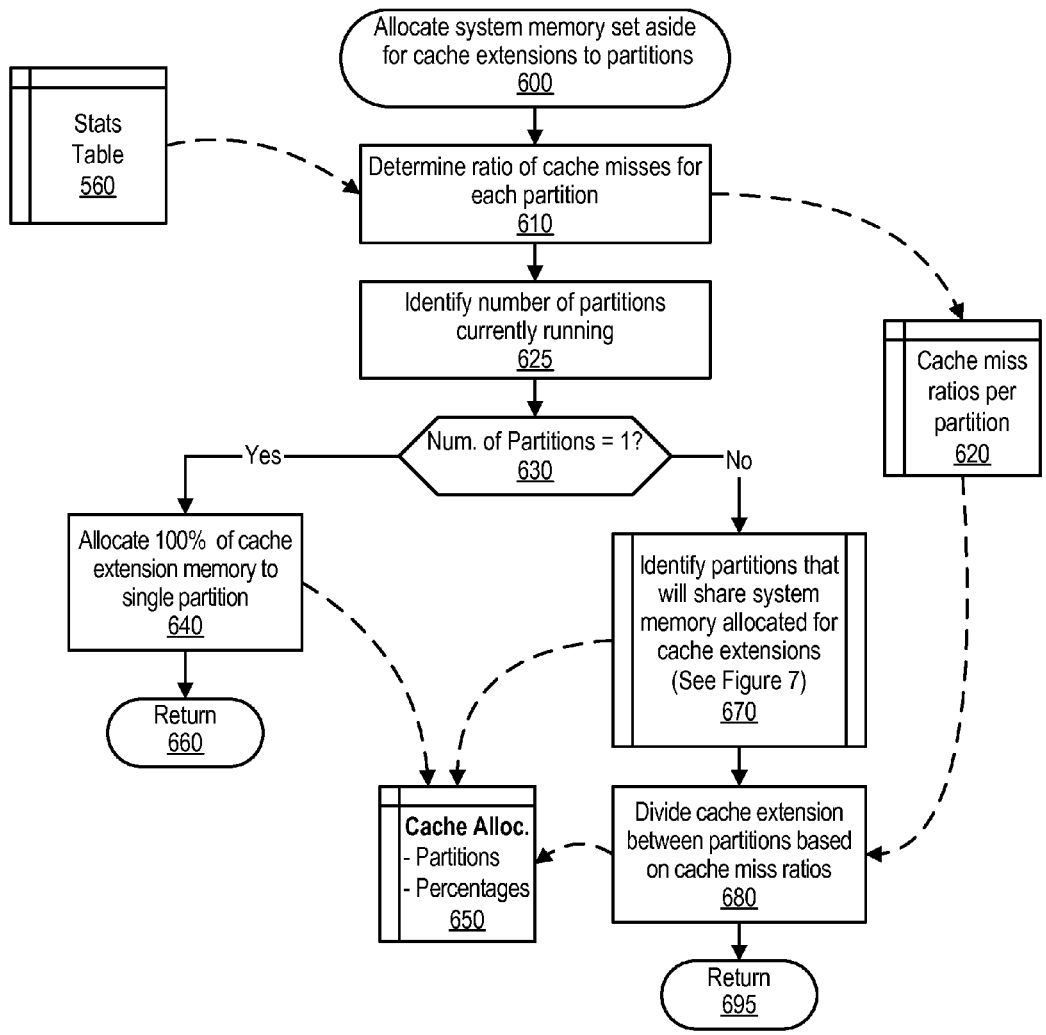
FIG. 6 is a flowchart showing steps taken to allocate system memory set aside for cache extensions to partitions.

FIG. 6 is a flowchart showing steps taken to allocate system memory set aside for cache extensions to partitions. This routine is called from predefined process 550 shown in FIG. 5. Processing of FIG. 6 commences at 600 whereupon, at step 610, the process determines the ratio of cache misses for each partition currently running on the computer system by reading the data collected and stored in the cache usage measurement statistics table introduced in FIG. 5. The cache miss ratios per partition are stored in memory area 620.

At step 625, the number of active partitions that are currently being executed by the computer system are identified. A determination is made as to whether the total number of partitions running in the computer system is equal to one (decision 630). If a single partition is running in the computer system then decision 630 branches to the "yes" branch whereupon, at step 640 the single partition receives all of the available cache extension memory for use with its cache. This allocation (100%) is stored in cache allocation memory area 650. Processing then returns to the calling routine (see FIG. 5) at 660.

Returning to decision 630, if the number of partitions that are currently running on the computer system is greater than one, then decision 630 branches to the "no" branch whereupon predefined process 670 is performed to identify partitions that will share the memory allocated for use by cache extension. At step 680, the identified partitions receive portions of the available cache memory based on their cache miss ratios so that partitions experiencing more cache misses (a higher cache miss ratio) receive more of the system memory allocated for cache extensions than partitions that are experience a lower cache miss ratio. The allocation of the cache extension amongst the identified partitions is stored in cache allocation memory area 650. For example, when two similar partitions are running and each are experiencing a similar cache miss ratio, then an identifier corresponding to each of the partitions would be written to cache allocation memory area 650 along with roughly equal percentages (roughly fifty percent each) dividing the cache extension essentially equally amongst the two partitions. In contrast, if two similar partitions are running but one was experiencing a substantially higher cache miss ratio than the other partition, then the identifier corresponding to each of the partitions would be written to cache allocation memory area 650 but the partition experiencing a higher cache miss ratio would receive a greater percentage (e.g., 80%) of the cache extension area with the other partition receiving the remainder (e.g., 20%) of the cache extension area. Division of the cache extension area would be performed in a similar manner when more partitions are being executed by the computer system so that those partitions with higher cache miss ratios receive more of the cache extension area than those partitions with lower cache miss ratios. After the partitions have been identified and the cache extension area has been divided amongst those identified partitions, processing returns to the calling routine (see FIG. 5) at 695.

Figure 7:
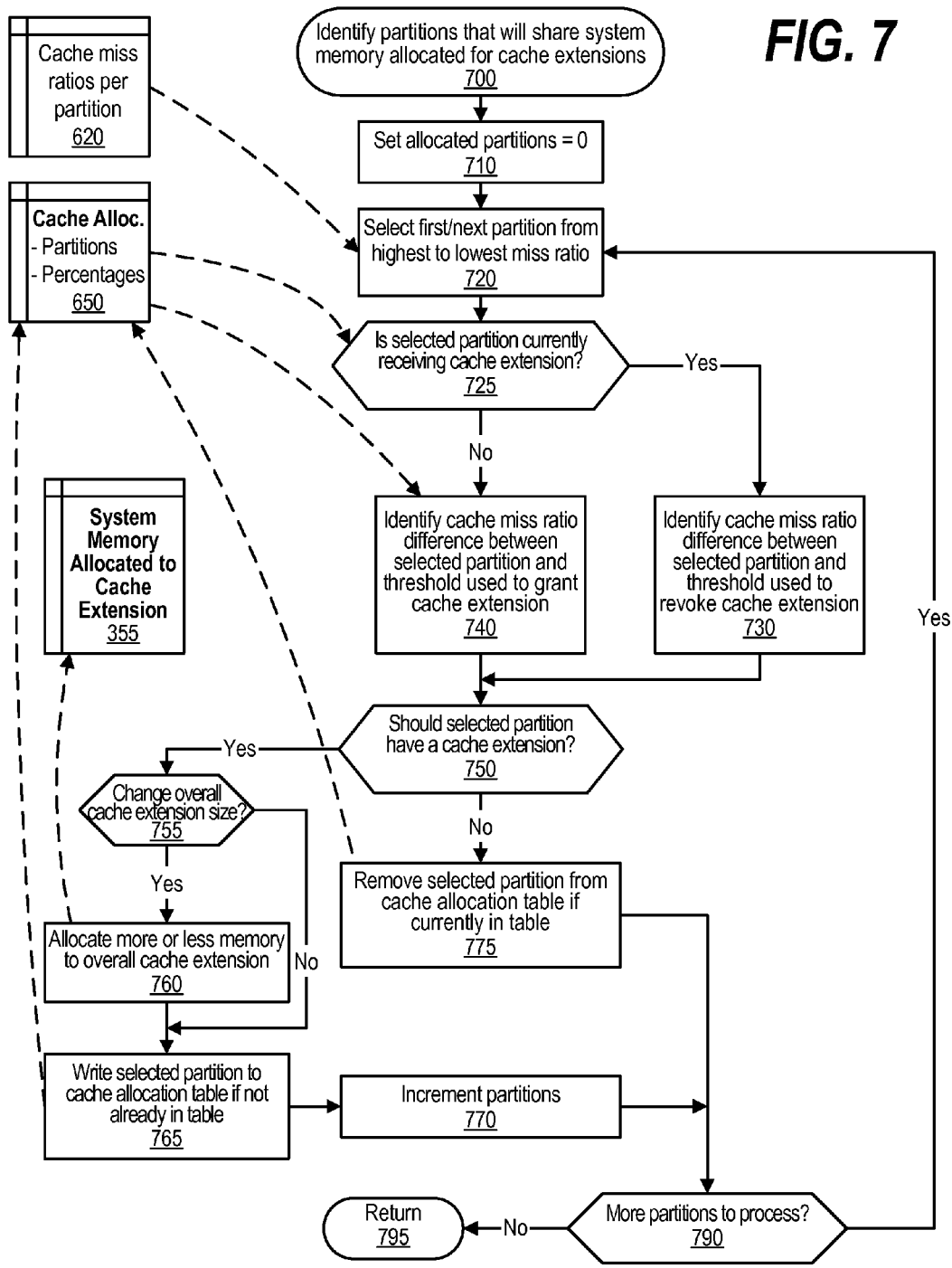
FIG. 7 is a flowchart showing steps used to identify partitions that will share system memory allocated for cache extensions.

FIG. 7 is a flowchart showing steps used to identify partitions that will share system memory allocated for cache extensions. This routine is called from predefined process 670 shown in FIG. 6. Processing of FIG. 7 commences at 700 whereupon, at step 710, the process initializes the number of allocated partitions to zero. At step 720, data pertaining to the first partition is selected from cache miss ratios memory area 620 with the partitions being selected in the order from highest cache miss ratio to lowest cache miss ratio. Consequently, the first partition selected is the partition with the highest cache miss ratio.

A determination is made as to whether the selected partition is currently receiving a portion of the cache extension memory by reading cache allocation memory area 650 (decision 725). If the selected partition is currently receiving a cache extension (from a previous execution of the routine shown in FIG. 7), then decision 725 branches to the "yes" branch whereupon, at step 730, a difference is identified between the current cache miss ratio for this partition and a threshold that is used to revoke the cache extension. In one embodiment, this threshold can be adjusted by system administrators in order to tune the computer system. On the other hand, if the selected partition is not currently receiving a cache extension (e.g., the previous execution of this routine determined that this partition should not receive a portion of the cache extension memory or if the partition has just recently been launched and this is the first time that this routine has processed data that included this partition), then decision 725 branches to the "no" branch whereupon, at step 740, a difference is identified between the current cache miss ratio for this partition and a threshold that is used to grant a cache extension to a partition. In one embodiment, this threshold can be adjusted by system administrators in order to tune the computer system. The thresholds used to revoke and grant cache extensions can be set to different values in order to reduce system overhead.

A determination is made as to whether the selected partition should have a cache extension based on the difference identified in either step 730 or 740 (decision 750). If the selected partition should receive a cache extension, then decision 750 branches to the "yes" branch. A determination is made as to whether a change should be made to the overall system memory allocated to cache extension 355 (decision 755). This decision can be made using a variety of factors such as the number of partitions running in the computer system, the number of partitions that should have a cache extension based on their current cache miss ratios, among other factors. If the overall system memory allocated to cache extension 355 should be changed, then decision 755 branches to the "yes" branch whereupon, at step 760, an amount of memory is allocated to system memory allocated to cache extension 355 (increased or decreased) based on the factors used to make decision 755. On the other hand, if the overall system memory allocated to cache extension 355 should not be changed, then decision 755 branches to the "no" branch bypassing step 760. At step 765, the process writes the partition identifier to cache allocation memory area 650 (if the process identifier is not already in cache allocation memory area 650) to record that this partition has been identified to receive additional cache extension memory. At step 770, the counter that keeps track of the number of partitions identified to receive additional cache extension memory is incremented.

Returning to decision 750, if the partition should not have a cache extension based on the difference identified in either step 730 or 740, then decision 750 branches to the "no" branch whereupon, at step 775, a check is made to determine if the selected partition is currently in cache allocation memory area 650 and, if a partition identifier corresponding to the selected partition is found, the partition is removed (deleted) from cache allocation memory area 650 as this partition has not been identified as a partition that should receive additional cache extension memory.

After the selected partition has been processed, a determination is made as to whether there are more partitions to process (decision 790). If there are more partitions to process, then decision 790 branches to the "yes" branch which loops back to select and process the next partition as described above. This looping continues until all of the partitions have been processed, at which point decision 790 branches to the "no" branch and processing returns to the calling routine (see FIG. 6) at 795.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a computer system comprising:
  identifying a plurality of cache extension sizes, wherein each of the identified cache extension sizes corresponds to one of a plurality of partitions running on the computer system, and wherein the identifying comprises:
    comparing recorded cache statistics corresponding to each of the plurality of partitions to one or more thresholds;
    identifying, based on the comparing, one or more of the plurality of partitions that should receive cache extensions; and dividing a system memory area based on the recorded cache statistics pertaining to each of the identified plurality of partitions;

extending a first hardware cache associated with a first processing core included in a processor's silicon substrate with a first memory allocation from the system memory area, wherein the system memory area is external to the silicon substrate and wherein the first memory allocation corresponds to a first of the plurality of cache extension sizes that corresponds to a first identified partition selected from the plurality of partitions that is being executed by the first processing core; and extending a second hardware cache associated with a second processing core included in the processor's silicon substrate with a second memory allocation from the system memory area wherein the second memory allocation corresponds to a second of the plurality of cache extension sizes that corresponds to a second identified partition selected from the plurality of partitions that is being executed by the second processing core.

2. The method of claim 1 further comprising:

recording the cache statistics pertaining to the plurality of partitions being executed by the processing cores; and allocating the first and second memory allocations from the system memory area based upon the recorded cache statistics.

3. The method of claim 2 wherein at least one of the recorded cache statistics is a cache miss ratio.

4. The method of claim 3 further comprising:

allocating more of the system memory to identified partitions with higher cache miss ratios.

5. The method of claim 1 wherein the first and second memory allocations are allocated from a system memory pool included in the system memory, wherein the method further comprises:

identifying a number of software partitions that will share the system memory pool;

calculating a memory size needed in the system memory pool; and changing the size of the system memory pool based on the calculated memory size.

6. An information handling system comprising:

one or more processors, wherein a selected one of the processors includes a silicon substrate that includes a plurality of processing cores and a plurality of caches, wherein the caches are associated with the processing cores;

a system memory external to the selected processor's silicon substrate that is accessible by the selected processor's processing cores;

a plurality of partitions executed by the selected processor;

a set of instructions executed by the selected processor in order to perform actions of:

identifying a plurality of cache extension sizes, wherein each of the identified cache extension sizes corresponds to one of the partitions running on the information handling system, and wherein the identifying comprises:

comparing recorded cache statistics corresponding to each of the plurality of partitions to one or more thresholds;

identifying, based on the comparing, one or more of the plurality of partitions that should receive cache extensions; and dividing the system memory area based on the recorded cache statistics pertaining to each of the identified plurality of partitions;

extending a first hardware cache associated with a first processing core selected from the plurality of the selected processor's processing cores with a first memory allocation from the system memory area, wherein the first memory allocation corresponds to a first of the plurality of cache extension sizes that corresponds to a first identified partition selected from the plurality of partitions that is being executed by the first processing core; and extending a second hardware cache associated with a second processing core included in the processor's silicon substrate with a second memory allocation from the system memory area, wherein the second memory allocation corresponds to a second of the plurality of cache extension sizes that corresponds to a second identified partition selected from the plurality of partitions that is being executed by the second processing core.

7. The information handling system of claim 6 wherein the actions further comprise:

recording the cache statistics pertaining to the plurality of partitions being executed by the processing cores; and allocating the first and second memory allocations from the system memory area based upon the recorded cache statistics.

8. The information handling system of claim 7 wherein at least one of the recorded cache statistics is a cache miss ratio.

9. The information handling system of claim 8, wherein the actions further comprise:

allocating more of the system memory to identified partitions with higher cache miss ratios.

10. The information handling system of claim 6 wherein the first and second memory allocations are allocated from a system memory pool included in the system memory, wherein the actions further comprise:

identifying a number of software partitions that will share the system memory pool;

calculating a memory size needed in the system memory pool; and changing the size of the system memory pool based on the calculated memory size.

11. A computer program product stored in a computer storage medium, comprising functional descriptive material that, when executed by an information handling system, causes the information handling system to perform actions that include:

identifying a plurality of cache extension sizes, wherein each of the identified cache extension sizes corresponds to one of a plurality of partitions running on the computer system, and wherein the identifying comprises:

comparing recorded cache statistics corresponding to each of the plurality of partitions to one or more thresholds;

identifying, based on the comparing, one or more of the plurality of partitions that should receive cache extensions; and dividing a system memory area based on the recorded cache statistics pertaining to each of the identified plurality of partitions;

extending a first hardware cache associated with a first processing core included in a processor's silicon substrate with a first memory allocation from the system memory area, wherein the system memory area is external to the silicon substrate and wherein the first memory allocation corresponds to a first of the plurality of cache extension sizes that corresponds to a first identified partition selected from the plurality of partitions that is being executed by the first processing core; and extending a second hardware cache associated with a second processing core included in the processor's silicon substrate with a second memory allocation from the system memory area wherein the second memory allocation corresponds to a second of the plurality of cache extension sizes that corresponds to a second identified partition selected from the plurality of partitions that is being executed by the second processing core.

12. The computer program product of claim 11 further comprising additional actions of:

recording the cache statistics pertaining to the plurality of partitions being executed by the processing cores; and allocating the first and second memory allocations from the system memory area based upon the recorded cache statistics.

13. The computer program product of claim 12 wherein at least one of the recorded cache statistics is a cache miss ratio.

14. The computer program product of claim 13 further comprising additional actions of:

allocating more of the system memory to identified partitions with higher cache miss ratios.

* * * * *